United States Patent Office 3,462,500
Patented Aug. 19, 1969

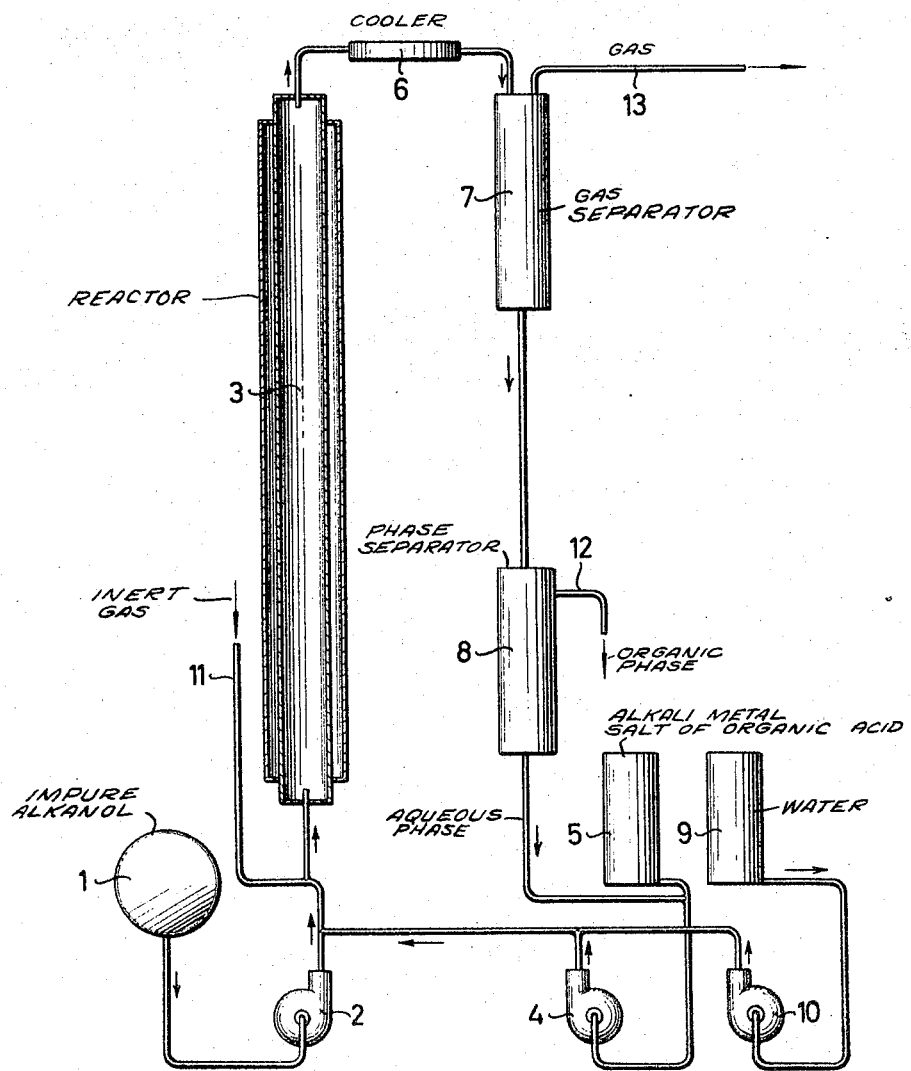

3,462,500
PROCESS FOR THE PURIFICATION OF ALCOHOLS CONTAINING FORMIC ACID ESTERS
Hans Tummes, Oberhausen-Sterkrade-Nord, and Josef Meis, Oberhausen-Osterfeld, Germany, assignors to Ruhrchemie Aktiengesellschaft, Oberhausen-Holten, Germany, a corporation of Germany
Filed Oct. 12, 1966, Ser. No. 591,074
Claims priority, application Germany, Oct. 16, 1965,
R 41,771
Int. Cl. C07c 29/24
U.S. Cl. 260—643    7 Claims

ABSTRACT OF THE DISCLOSURE

Process for purifying alkanols prepared by the oxo reaction and containing formic acid esters by eliminating such esters comprising heating such a mixture with an aqueous solution of an alkali metal formate, acetate or oxalate at a temperature of from 200 to 260° C.

---

This invention relates to a process for the separation of formic acid esters from mixtures thereof with alcohols. More particularly, this invention relates to a process for the production of formic acid ester free-alcohols from oxo-synthesis reaction products.

It is known that formic acid esters are generally formed as byproducts in processes for the production of aldehydes and alcohols by carbonylation of olefins with carbon monoxide and hydrogen, i.e., the so-called ovo-synthesis reaction. (See U.S. Patent 2,779,794, col. 3, lines 4–13). The primary reaction products of the said oxo-synthesis contain up to 10% formic acid esters depending upon the reaction conditions. The bulk of the formic acid esters contains as alcohol component the alcohol derived from the charged olefin, but contains one additional carbon atom; a minor amount of the esters consists of formic acid esters of higher molecular compounds of alcoholic nature. As the boiling points of the alcohols differ only insignificantly from those of the corresponding formic acid esters and as these alcohols often form azeotropic mixtures with their formic acid esters, the distillative recovery of pure alcohols from the oxo-synthesis reaction products in the presence of the corresponding formic acid esters is extremely difficult and very complicated.

Several processes directed at the removal of those esters are known. Thus, it has been proposed in DAS 1,108,195 to improve the quality of the alcohols prepared by the oxo process by treating the oxo-synthesis reaction product with mineral acids or acid reacting salts of mineral acids. Instead of the mineral acids, it has been suggested to use Lewis acids, as, for instance, aluminum trichloride or boron trifluoride (See DAS 1,148,221; U.S. application Ser. No. 807,860.) The aforesaid procedures for the treatment of the alcohol reaction products with acids results not only in a decrease of yield of alcohols but also gives rise to serious corrosion problems, which latter problems can only be overcome by the use of expensive corrosion resistant materials. According to still another process, the raw alcohol oxo-synthesis reaction products were treated with alkaline reacting substances, as, for instance, aqueous or alcoholic caustic solutions or alkaline reacting ion exchangers in order to remove the esters as well as other impuritiess therefrom and thereby improve the quality of the resultant alcohol. (See British Patent 825,359.) The alkaline saponification of the formic acid esters has the disadvantage that the alkaline substances are required to be used in higher than stoichiometric amounts, so that the product to be treated could not contain significant amounts of aldehydes or aldehyde-like compounds, as these would be converted to undesired byproducts by the alkaline compounds, resulting in losses in the yield of valuable products.

It is an object of the present invention to provide a process for removing formic acid ester byproducts from the oxo-synthesis reaction product.

It is a further object of the present invention to provide a process for preparing formic acid ester free alcohols from reaction products produced by hydroformylation of olefin (oxo-synthesis.)

It is still a futher object of the present invention to provide a process for preparing formic acid ester free alcohols from reaction products produced by hydroformylation of olefins (oxo-synthesis) in the absence of acids.

Further objects and advantages will appear hereinafter.

The above objects and other advantages are accomplished in accordance with the present invention by heating the reaction product obtained in the hydroformylation of an olefin (oxo-synthesis) comprising a mixture of alcohol and formic acid esters, to a temperature between 200 and 260° in the presence of an aqueous solution of an alkali metal salt of a strong organic acid. As the alkali metal salt of an organic acid, there can be used alkali metal formates, alkali metal acetates, alkali metal oxalates, and the like. In accordance with the invention the formic acid component of the esters is not liberated as such, but the esters are preferably split up according to the following equation:

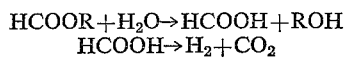
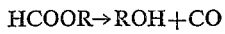

Simultaneously, the following reaction takes place:

$$HCOOR \rightarrow ROH + CO$$

which leads to the formation of alcohol and carbon monoxide. Thereby, the sole liquid reaction product formed is the alcohol of the formic acid ester, while the formic acid component of the ester is converted to the gases $CO_2$, CO and $H_2$. As a result, by the surprising effect of the weakly basic salt solutions on these esters, whereby any alcohol present in the formic acid esters is removed from the mixture thereof with alcohol without formation of liquid byproducts and without consumption of the salt solution, the process according to the invention is therefore superior to any hitherto known process for the removal of formic acid esters from their mixtures with alcohols. The process according to the invention does not give rise to any corrosion problems as occur in the treatment of alcohol-formic acid mixtures with mineral acids or Lewis acids. Furthermore, no undesired byproducts are formed, as is the case during the treatment of those mixtures of caustic materials.

The process of the invention is carried out by the simple expedient of heating the alcohol-ester mixture with an aqueous solution of an alkali metal salt of an organic acid to a temperature of from 200-260°. The concentration of the salt solution preferably amounts to 1 to 40%, and most preferably to 3 to 25%. The alkali metal salts most preferred for use herein are the alkali metal formates, since they possess the same acid component as the esters to be split up in the treatment.

Because sodium formate represents the most inexpensive alkali metal formate, solutions thereof are preferably used. For sake of simplicity, the term "sodium formate solution" is used in the following to designate the aqueous solutions of alkali metal salts of strong organic acids suitable for use according to the invention.

The sodium formate solution treatment of the oxo-synthesis mixtures according to the invention can be conducted discontinuously as well as continuously. When working discontinuously, the aqueous sodium salt solution has to be admixed with the organic alcohol phase. When working continuously, an intimate admixture of the substances can be effected with the aid of mechanical stirring devices but in the case that the treatment is carried out in a reaction tube, a sufficient intermixture is obtained, if the organic, i.e., alcohol phase flows through the aqueous solution, whereby the admixture and distribution of the liquid components can be further assisted by means of filling bodies or other like means.

The invention will be better understood by reference to the flow diagram shown in the accompanying drawing illustrating an embodiment of continuously operating the process according to the invention. The product to be treated, which is protected by an inert gas is charged from conduit 11 with the aid of a pump 2 from container 1 into the lower part of reaction tube 3. Sodium formate solution comprising a mixture of fresh sodium formate from storage container 5 and recirculated sodium formate solution is fed by means of pump 4 into the conduit discharging into the reaction tube 3. The products to be reacted ascend in the reaction tube 3 heated to about 230° and are introduced via a cooler 6 into a gas separator 7. In the separator 7, the liquid product is separated from the reaction gases. The liquid product comprising a lower aqueous phase and an upper organic phase enters a separating vessel 8, wherein phase separation occurs. While the organic product containing some dissolved decomposition gas is removed from subsequent treatment through conduit 12, the lower sodium formate containing aqueous phase is recirculated from separating vessel 8 to reaction tube 3 after having first been replenished with fresh sodium formate from storage container 5 and with water. The introduction of water from water container 9 is effected under use of pump 10. In reaction tube 3, the level of the sodium formate solution is maintained at about one-third to three-quarters of the height of the reaction tube 3. The pressure in the reaction system has to be maintained, depending upon the temperature and the vapor pressure of the organic product to be treated, sufficiently high that no boiling of the liquid reaction product occurs. Decomposition gas is removed via conduit 13.

Any mixture containing formic acid esters in admixture with alcohols can be treated with sodium formate according to the invention. The presence of other different organic compounds does not impair the splitting of the formic acid esters. The process according to the invention is particularly suited for the treatment of mixtures of formic acid esters with alcohols obtained as distillation residue in the distillation of the raw aldehydes obtained by the oxo-synthesis. Particularly favorable results are achieved, if the product recovered by subjecting propylene to the oxo-synthesis followed by distillative separation of the iso- and normal butyr-aldehydes formed is used as starting material. Heretofore, i.e., prior to the process according to the invention, no pure alcohols could be obtained from the said distillation residues unless considerable losses of the alcohol product were accepted. In carrying out the distillative separation of the alcohols from residues of the said aldehyde distillation, the formic acid esters present can be removed as first runnings. However, since the formic acid esters form azeotropic mixtures with the alcohols, considerable amounts of alcohols are removed together with the formic acid esters as early runnings.

On subjecting the formic acid ester-containing products to hydrogenation in the presence of nickel catalysts, splitting of the formic acid esters takes place with considerable damage to the catalyst, probably due to poisoning of the catalyst by carbon monoxide, which is liberated in the decomposition of the formic acid esters in accordance with the equation $$HCOOR \rightarrow ROH + CO$$

Therefore, the hydrogenation of such formic acid esters containing products is always associated with a consumption of nickel the degree depending on the content of esters in the material being subjected to hydrogenation. Thus, the working up of reaction products with a high content of formic acid esters, as, for instance, the hereinbefore-mentioned distillation residues of aldehyde oxo-products, is uneconomical.

With the process according to the invention, these disadvantages can be avoided. The salt solution used as reaction solution remains unchanged and is not used up. The reaction can be continuously conducted in simple manner with high throughputs. As side product, only gaseous compounds are formed, which can easily be separated off.

The invention is illustrated by the following examples of certain preferred embodiments, although it will be understood that the examples are illustrative and not intended to limit the scope of the invention unless otherwise specifically indicated. Unless otherwise specified, parts disclosed in examples are parts by weight.

EXAMPLE 1

A laboratory autoclave equipped with a magnetic rotating stirrer and having a lining of chrome nickel steel (trade name V IV a) was charged for each run with two liters of a product having the following composition:

|  | Percent |
|---|---|
| i/n-Butyl-formic acid-ester | 40 |
| i/n-Butylalcohol | 47 |
| i/n-Dibutylether | 8 |
| Water | 5 |

400 cm.³ of an aqueous solution or suspension of one of each of the substances listed in the following table were added to the mixture in the autoclave for each run. The autoclave was then closed and heated to 250° for two hours under stirring and cooled. Thereafter, the amount of i/n-butyl-formic acid-ester present in the upper layer of the withdrawn reaction product was determined.

The following values were found for the conversion of i/n-butyl-formic acid ester to i/n-butylalcohol:

| Added substance | Percent by weight depending upon water | Butyl-formic acid-ester converted (percent by weight) |
|---|---|---|
| None (control test) | | 53 |
| Sodium formate | 3.0 | 99 |
| Potassium formate | 3.0 | 99 |
| Sodium oxalate | 5.0 | 99 |
| Sodium acetate | 5.0 | 97 |
| Potassium acetate | 5.0 | 98 |
| Sodium sulfate | 5.0 | 73 |
| Magnesium oxide | 5.0 | 40 |
| Calcium oxide | 5.0 | 33 |
| Aluminum oxide | 5.0 | 43 |

EXAMPLE 2

2.5 liters of a product having the composition as set out in Example 1 and 0.5 liter of an aqueous sodium formate solution having a sodium formate content of 20% were introduced into the autoclave as described in Example 1. The mixture was then heated to 250° C. under stirring for two hours, whereby the pressure amounted to about 110 atm. gauge. The gas which was evolved during the reaction due to the decomposition of the formic acid consisted predominantly of carbon dioxide and hydrogen and small amounts of carbon monoxide.

The autoclave was opened and following cooling and separating off of the aqueous phase, the content of butyl-formic acid-ester of the reaction product was determined as 0.3%; the content of butylalcohol was found to have increased to 81%.

EXAMPLE 3

According to the process described in Example 2, a product comprising the di-formic acid-ester of 1,3-propanediol was contacted with aqueous 20% sodium formate solution, under heating to 230° for two hours. It was determined that 98% of the ester had been converted to the corresponding dialcohol.

EXAMPLE 4

An unfilled pressure tube of chrome nickel steel (trade name V II a) having a height of 10 m. and an inner diameter of 45 mm. was charged with 10 liters of 20% aqueous sodium formate solution and pressurized with nitrogen under a pressure of 20 atm. gauge. The tube was heated by means of a hot water circulation system. After reaching a temperature of 230° C. 12 liters of an oxo-synthesis product containing 20% butylformate and 3.2 liters of recirculated aqueous sodium formate solution (replenished with condensed water and 0.05% fresh sodium formate depending on the oxo-synthesis product) were passed per hour through the said tube using a dosing pump, respectively. The product of the oxo-synthesis which is involved herein was the residue of the distillation of butyraldehyde and had been obtained by the reaction of propylene with carbon monoxide and hydrogen. The reaction product, which was substantially ester-free (except for a residual content of about 0.1% butylformate), was discharged from the head of the tube, passed through a cooler and introduced into a gas separator. The pressure prevailing in the reaction tube was adjusted to 60 atm. gauge by means of a control valve, whereby a corresponding amount of decomposition gas escaped. The reaction product following discharge from the gas separator, was expanded using a stand-regulating valve and introduced into a separating vessel, wherein an organic layer was separated from an aqueous layer at about 40° C. The aqueous layer which consisted of about 2 liters of water containing about 3% sodium formate was replenished with 1.2 liters distilled water and 5 g. sodium formate and thereafter introduced with the aid of a pump into the bottom of the tube. 12.7 liters of reaction product containing 8 to 10% water in solution were removed per hour from the separating vessel.

EXAMPLE 5

Following the procedure of Example 4, 2 liters of a product which contained 20% butylformate were passed per hour through a reaction tube having a height of 3 m. and an inside diameter of 30 mm. constructed of high quality steel lined with high percent chrome nickel steel (trade name "Hastelloy") and which had been filled with 3 mm. ceramic rings at a temperature of 230° and a pressure of 60 atm. gauge. The product as recovered was freed of esters to a grade of purity of more than 99%.

EXAMPLE 6

A reaction tube as described in Example 5 was charged at the bottom thereof with an oxo-synthesis product containing 25% iso-octyl formate with a load of 0.5 v./vh., as well as 20% by volume, calculated on the organic phase, of a 5% sodium formate solution at 250°, under a pressure of 100 atm. gauge. The formic acid ester content of the product which was recovered was decreased to 2%.

EXAMPLE 7

A reaction tube as described in Example 5 was charged at the bottom thereof with an oxo-synthesis product containing 25% iso-octyl formate with a load of 0.5 v./vh., as well as 20% by volume, calculated on the organic phase, of a 5% potassium formate solution at 250°, under a pressure of 100 atm. gauge. The formic acid ester content of the product which was recovered was decreased to less than 2%.

We claim:

1. A process for the purification of alkanols prepared via the oxo reaction and containing formic acid esters arising in the oxo synthesis, by elimination of said formic acid esters which comprises heating such a mixture with an aqueous solution of an alkali metal salt of a strong organic acid selected from the group consisting of formic, acetic and oxalic acids at temperatures from 200 to 260° C.

2. Process according to claim 1 wherein said formic acid ester-alcohol mixture is obtained as the distillation residue of the raw aldehyde reaction product formed in the oxo-synthesis.

3. Process according to claim 1 wherein said formic acid ester-alcohol mixture is obtained as the distillation residue of the raw iso- and normal-butyraldehyde reaction product formed in the hydroformylation of propylene.

4. Process according to claim 1 wherein said aqueous alkali metal salt solution has a concentration of between 1 and 40% by weight.

5. Process according to claim 1 wherein said aqueous alkali metal salt solution has a concentration of between 3 and 25% by weight.

6. Process according to claim 1 wherein said alkali metal salt is an alkali metal formate in the form of its solution.

7. Process according to claim 1 which comprises effecting said separation of formic acid esters from their mixtures with alcohol by introducing said alkali salt solution into the bottom of a reaction zone filled to about 75% with said alkali salt solution, withdrawing the diluted alkali metal salt solution from the top of said reaction zone and recycling said withdrawn alkali metal salt solution following addition of water.

References Cited

UNITED STATES PATENTS 2,626,284  1/1953  Smith.
2,990,340  6/1961  Barnes.

LEON ZITVER, Primary Examiner

U.S. Cl. X.R.

260—637